RAYMOND F. BADDOUR
INVENTOR.

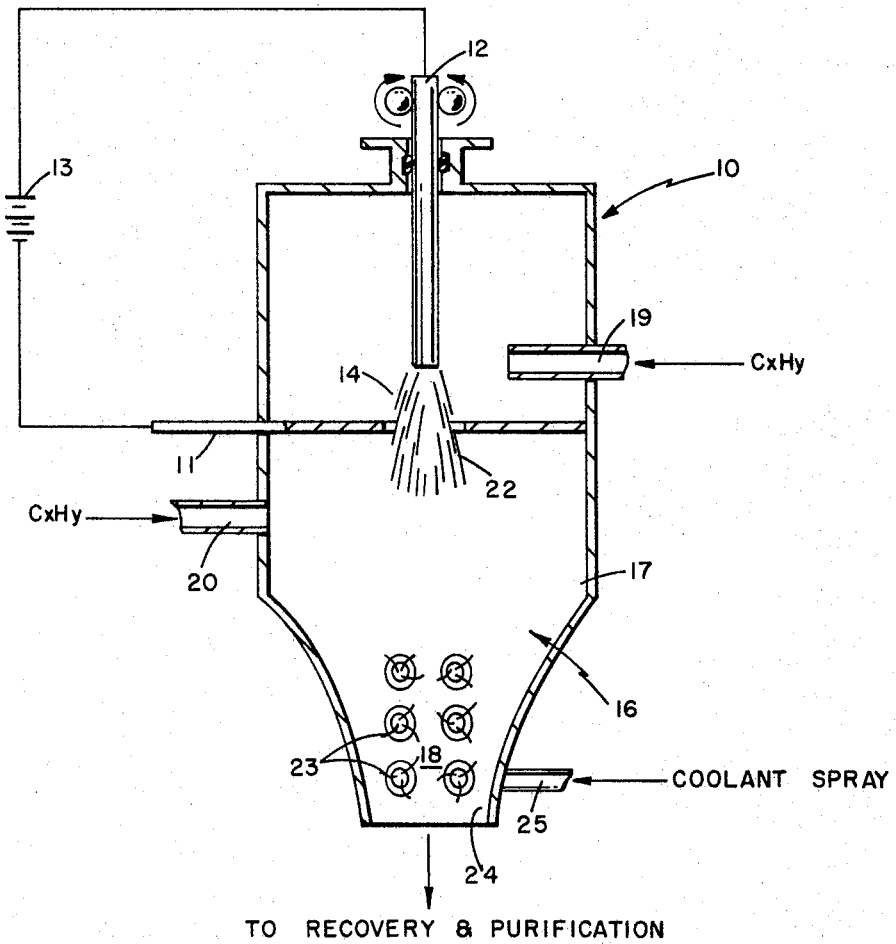

United States Patent Office 3,333,927
Patented Aug. 1, 1967

3,333,927
ELECTROTHERMAL PROCESS FOR PRODUCING
ACETYLENE AND CARBON BLACK
Raymond F. Baddour, Belmont, Mass., assignor to Avco
Corporation, Cincinnati, Ohio, a corporation of Delaware
Filed July 22, 1963, Ser. No. 296,588
19 Claims. (Cl. 23—209.3)

This invention relates generally to high temperature chemical processes and more particularly to a process for reacting carbon vapor with hydrocarbons for producing acetylene and other useful products. For the purpose of this discussion, quantitative values cited will be volumetric unless specifically noted otherwise.

It has long been known that to pass a hydrocarbon through an electric arc followed by rapid quenching of the reaction products gives acetylene. Although the yields—the percentage of hydrocarbons converted to acetylene—have been in the order of 30–80%, the volumetric concentration of acetylene found in the quenched reaction products has been small. For example, methane might be cracked to provide 100% acetylene yield, yet the concentration of acetylene in the reaction products, which in this case includes acetylene and hydrogen, cannot exceed 25%.

For the purpose of this discussion, the proportion of a specific product in the gas phase, acetylene ($C_2H_2$) or hydrogen ($H_2$) for example, will be referred to as the concentration. Since the product concentration is an important consideration in determining the economic feasibility and competitive advantages or disadvantages of processes, this discussion will emphasize concentration.

Most of the prior art processes for producing acetylene by the utilization of electric arcs are directed to cracking processes wherein a hydrocarbon is pyrolized to acetylene, hydrogen, and other products. In these processes, there is no substantial reaction of the hydrocarbon with other elements, particularly carbon. To the extent that such a reaction takes place, the reaction is unavoidable and not specifically encouraged. A notable exception to the foregoing is the reaction of hydrocarbons with nitrogen to produce hydrogen cyanide and other hydrogen-nitrogen combinations.

The Smyers Patent No. 2,165,820 describes a process wherein a hydrocarbon fluid is combined with comminuted particles of carbon and the combination is passed through a carbon arc. The Smyers patent discloses 30–80% conversion of hydrocarbon to acetylene. Since the conversion is less than 100%, there is a net yield of solid carbon ($C_s$). In the case of methane as the feed gas, the concentration may approach, but does not exceed the theoretical limit of 25%. Assuming the complete decomposition of methane, a 30–80% yield will correspond to 7.5% to 20% concentration of acetylene.

Weir in his U.S. Patents 2,731,410 and 2,768,947, discusses reacting hydrocarbons with carbon. With regard to his discussion it is significant that:

(1) solid particles, which included carbon, were injected into the reaction chamber, and supplied heat for chemical reaction. The solid carbon was proported to have entered into the reaction. There was no disclosure of a net reaction of carbon;

(2) the reaction described in Weir's Equation (3) with solid carbon is endothermic, whereas reactions involving carbon in the gas phase are exothermic; and (3) Weir's process makes no provision for controlling the ratio of carbon to hydrogen in the gas phase.

It is an object of this invention to provide processes for producing acetylene and other useful products which avoid the limitations and disadvantages of prior processes.

It is another object of this invention to provide processes for mixing and reacting hydrocarbons with carbon vapor for producing acetylene and other useful products.

Other objects of this invention are to provide processes for producing acetylene in which:

(1) carbon vapor is reacted with hydrocarbons in an electric arc to provide acetylene concentrations in excess of concentrations obtainable by direct pyrolysis of gaseous hydrocarbons;

(2) methane is reacted with carbon vapor for producing acetylene concentrations in excess of concentrations obtained by pyrolysis in a relatively simple and facile manner;

(3) an electric arc is used to generate a carbon vapor atmosphere and to heat a hydrocarbon feed gas to high temperatures, so that it will react with the carbon vapor;

(4) the $C/H_2$ ratio in the gas phase can be varied and controlled independently of that in the feed gas; and (5) the product composition of acetylene may be varied independently of the feed gas.

Still another object of this invention is to provide a process for producing a high structure, high surface area, and graphitic carbon black by the reaction of a hydrocarbon with carbon vapor.

Yet another object of this invention is to provide a process for producing a high structure carbon black, whose electrical properties and surface area are comparable to high quality acetylene black, by reacting a hydrocarbon with carbon vapor produced by means of an electric arc.

The present process for making acetylene and other useful products comprises mixing and reacting a hydrocarbon with carbon vapor. The carbon vapor is preferably generated by volatilizing a carbonaceous electrode acting as a terminus of an electric arc. The hydrocarbon is fed continuously to a reaction chamber and when it is exposed to the high temperatures at which carbon exists as a vapor, the hydrocarbon is dissociated. Atomic and molecular carbon and hydrogen including carbon and hydrogen radicals, designated generally $C_xH_y$ thus formed mix and react. The mixture then passes to a quenching chamber where it is cooled to or below temperatures at which the rate of acetylene decomposition is negligible. The products of the quenched mixture, specifically acetylene, are then removed from the quenched chamber and recovered.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

FIGURE 2 is a schematic representation of an apparatus for carrying out the process described herein.

THEORY

Figure 1:
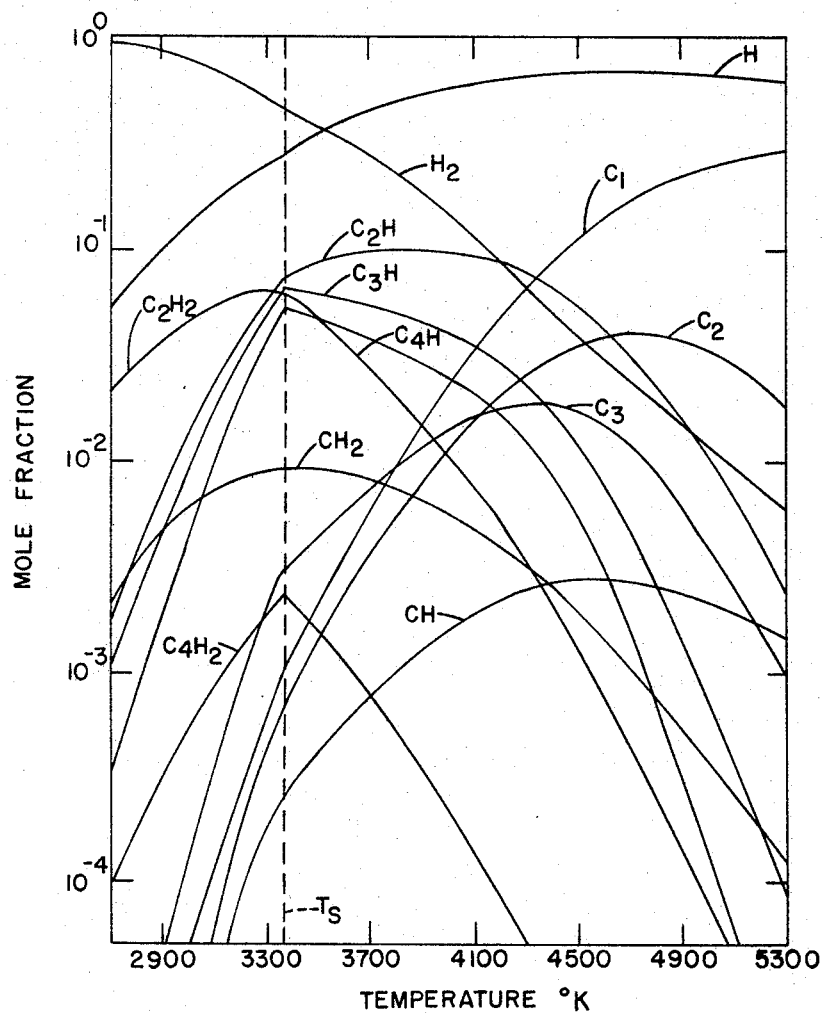
FIGURE 1 depicts a series of curves useful in explaining the invention.

In considering the theory of the reactions, it is important to remember that the precise reactions or mechanisms of high temperature chemical reactions, particularly with hydrocarbons, are not precisely known. The important consideration in this entire discussion is the fact that extremely high concentrations of acetylene are produced by reacting hydrocarbons with carbon vapor. Additionally, a high structure carbon black product is also produced, which because of its high quality and physical character, can be used in electrical applications such as batteries and to impart electrical conductivity to plastics and rubber.

It is well known that hydrocarbons, when raised to extremely high temperatures, are broken down into a number of carbon hydrogen radicals ($C_xH_y$) and into atomic and molecular carbon and hydrogen species. Typically, in the vicinity of 4,000° K., hydrocarbons are unstable and break down. Under equilibrium conditions the following are thought to be the predominant forms: $C_1$, $C_2$, $C_3$, H, $H_2$, $C_2H_2$, $C_2H$, $C_3H$, $C_4H$, CH, $CH_2$, and $C_4H_2$. It is well known that carbon and hydrogen combine at high temperatures to form acetylene $C_2H_2$. Additionally it is believed that $C_2H$ acts as a precursor in the production of acetylene; this reaction will be discussed hereafter.

Under equilibrium conditions, the aforementioned C, H, and $C_xH_y$ species are constantly being formed and broken up in typical reversible chemical reactions. Briefly, when the various species of C, H, and $C_xH_y$ are rapidly quenched, the highly reactive species radicals will tend to be converted to species that are more stable at lower temperatures, e.g., $C_s$ solid carbon, $H_2$ and acetylene. It is recognized that $C_2H_2$ exists in a metastable state at room temperatures. However, its tendency to convert to a more stable form normally is imperceptibly slow. Acetylene at elevated temperatures, 1000° K. and higher, is substantially more stable than other hydrocarbons.

PROCESSES

Referring to the schematic representation in FIGURE 2, a hydrocarbon is typically reacted with carbon vapor in the apparatus 10. The apparatus 10 includes a cathode electrode 11 shaped in the form of a ring and an elongated anode electrode 12. The electrodes 11 and 12 are coupled to a power supply means, designated by battery 13, and are adapted to act as the terminal points of an electric arc flowing in the space 14 separating these electrodes.

The apparatus 10 includes a chamber 16 which is functionally but not necessarily physically divided into a reaction chamber 17 and a quenching chamber 18. The reaction chamber 17 includes a pair of entrance ports 19 and 20 through which a hydrocarbon, $C_xH_y$, is supplied. In the event it is desired to feed a hydrocarbon directly to the arc, the hydrocarbon is fed through entrance port 19. In the alternative, the hydrocarbon may be fed through entrance port 20 into a tail flame 22 comprising carbon vapor. A third possible procedure is to supply hydrocarbon through both entrance ports 19 and 20 simultaneously.

In the event the hydrocarbon is fed through entrance port 19, the tail flame 22 will comprise a mixture of ionized hydrocarbon and carbon vapor. Clearly, if only entrance port 20 is used, the tail flame comprises carbon vapor. The quenching chamber 18 includes means for reducing the temperature of the mixture of hydrocarbon and carbon vapor very quickly. The quenching action preferentially produces acetylene, in addition to solid carbon, hydrogen and small amounts of other products. The quenching chamber 18 reduces the temperature of the hydrocarbon carbon vapor mixture to a temperature below which the decomposition rate of acetylene is negligible. Schematically, the quenching chamber 18 is shown as a spray means wherein a coolant is supplied through the entrance port 25 to spray nozzle 23 opening into the quenching chamber 18. In the alternative, the chamber 18 may be a fluidized bed, or an externally cooled surface. The coolants may be water, gas, or hydrocarbon oils. In the event hydrocarbon oils or gases are used, the heat absorbed by the coolant may pyrolize the coolant into other useful products including additional quantities of acetylene.

The quenched gases are removed from the quenching chamber 18 through the exit port 24.

A suitable hydrocarbon feed stock is methane because of its general availability, its low cost and the ease with which it can be converted to acetylene. However, any hydrocarbon that reacts under the process conditions is suitable as a feed stock. Such hydrocarbons include the saturated aliphatics such as methane, ethane, propane, butane, pentane and the light petroleum naphtha fractions, the unsaturated aliphatics such as ethylene, propylene, butylene and the like, the cycloaliphatics such as cyclobutane, cyclopentane, cyclohexane and the like, and the lower aromatics such as benzene, toluene and xylene.

Carbon vapor is supplied by vaporizing carbon from an electrode, preferably the anode electrode. As is well known, the anode electrode of an electric arc tends to absorb enormous amounts of energy and is quickly heated to vaporization temperatures unless cooled by some external means. The anode is formed from a carbonaceous material, e.g., carbon, graphite, petroleum coke or coal and encouraged to volatilize at a controlled rate. An important consideration in the present invention is that the ratio of carbon to hydrogen in the gas phase, $C/H_2$, is easily specified by controlling the quantity of hydrocarbon fed to the reaction chamber as well as controlling the volatilization rate of the anode. The volatilization rate is determined by the power supplied to the arc, the cross-sectional area of the arc, and the cross-sectional area of the electrode. Typical operating parameters are as follows:

Anode diameter: ⅜-inch
Cathode diameter: 1 inch
Voltage: 55 volts
Current: 460 amps
Carbon feed rate: 16.3 grams per min.
Methane feed rate: 1.5 liters per min.
Acetylene content in product gas: 52%

As an alternative to the arc, carbon vapor may also be produced by resistance heating a carbonaceous material to a temperature at which the carbon volatilizes.

Referring to FIGURE 1, there are shown curves representing the results of an analytical study of the predominant C, H, $C_xH_y$ species in equilibrium, at atmospheric pressures, and at temperatures in the vicinity of the vaporization temperature ($T_s$) of carbon for a $C/H_2$ ratio of one.

In order to make predictions as to the concentrations of acetylene which might be obtained by rapid quenching of these species, the following reactions might be assumed to occur in the quenched step:

| High Temperature Specie | Quenched Product | |
| --- | --- | --- |
| $H_2$, 2H ⟶ | $H_2$ | (1) |
| $C_2H_2$ ⟶ | $C_2H_2$ | (2) |
| $C_1$, $C_2$, and $C_3$ ⟶ | $C_s$ | (3) |
| $C_2H + H$ ⟶ | $C_2H_2$ | (4) |
| $C_xH_y$ (remaining) ⟶ | $C_s$ or $H_2$ | (5) |

The results of the above analysis indicate that optimum acetylene concentrations might be obtained if a gas in equilibrium at a temperature in the range of 3500° K.–4600° K. is rapidly quenched. However, experimental results tend to point to the fact that the reaction of hydrocarbon with a carbon vapor in an electric arc does not achieve equilibrium and that quite unpredictably the reaction of hydrocarbon and carbon vapor tend to produce acetylene in concentrations greater than those computed by this analysis. Complex mechanisms of mixing, reaction kinetics, and energy transfer, not taken into account in the analysis affect the actual yield of acetylene. These and other complex mechanisms, although not understood, apparently aid in the production of acetylene.

The concentration of acetylene in the quenched reaction products under varying conditions is illustrated in the following chart:

CARBON VAPOR—METHANE RUNS

| Run | Power (kw.) | CVR [1] (grams/min.) | C/H$_2$ (feed) | Concentration C$_2$H$_2$ (volume percent)[2] |
|---|---|---|---|---|
| 1 | 16.8 | 6.70 | 4.99 | 31.7 |
| 2 | 21.7 | 9.40 | 6.8 | 35.5 |
| 3 | 25 | 12.8 | 9.1 | 37.6 |
| 4 | 20.8 | 12.2 | 8.65 | 34.5 |
| 5 | 25.3 | 16.3 | 11.45 | 52.0 |
| 6 | 19.1 | 9.7 | 13.4 | 40.6 |
| 7 | 22.8 | 10.2 | 14.2 | 35.0 |
| 8 | 26.6 | 12.8 | 17.7 | 38.2 |
| 9 | 27.1 | 14.6 | 20.1 | 32.6 |
| 10 | 28.0 | 16.1 | 22.1 | 40.0 |

[1] Carbon Vaporization Rate.
[2] Remainder: H$_2$ and less than 1–3% CH$_4$, C$_4$H$_2$, C$_2$H$_4$, and other trace products.

It will be noted in particular that the acetylene concentration in all cases shown in the preceding table exceeds 25%—the theoretical maximum obtainable from cracking methane. In several instances, the acetylene concentration exceeded 40%. Since for methane the ratio of carbon to hydrogen (C/H$_2$) is 1/2, a 40–50% concentration of acetylene in the quenched gas represents a 160–200% carbon conversion based on the carbon in methane. Obviously, the excess carbon is derived from the carbon vapor and there is a net loss of carbon during the process to form acetylene. The acetylene concentrations cited in the table are believed to be limits imposed by the equipment used rather than process limitations.

Under the conditions specified in the table, particularly the carbon vaporization rate and the utilization of carbon, it is clear that a quantity of the carbon vapor reverts to solid carbon, specifically a carbon black, when the hot gases are quenched. The deposited carbon black has a high surface area and is graphitic in structure and closely resembles acetylene black in properties, particularly electrical properties. It is thus a valuable product.

In general, the portion of carbon black produced is increased as the carbon to hydrogen feed ratio is increased. While the feed ratio may be increased by using a higher saturated aliphatic such as propane or one of the light naphtha fractions, an unsaturated aliphatic such as ethylene or an aromatic such as benzene as the feed stock, it is generally more convenient to adjust the C/H$_2$ ratio by adjusting the carbon vaporization rate.

In summary, the reaction of a hydrocarbon with carbon vapor:

(1) Produces acetylene concentrations far exceeding those attainable by cracking processes;

(2) Sets into motion kinetic mechanisms which tend to produce high acetylene concentrations; and (3) Produces a high quality graphitic carbon black.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

I claim:

1. A process for producing acetylene comprising the steps of:
   (a) providing an independent source of carbon vapor;
   (b) mixing and reacting at least one hydrocarbon with carbon vapor at a temperature exceeding the temperature at which carbon exists as a vapor to produce reaction products; and
   (c) rapidly quenching the reaction products to a temperature below which acetylene decomposition rate is negligible.

2. A process as defined in claim 1 in which said reaction takes place in the vicinity of one atmosphere pressure.

3. A process as defined in claim 1 in which said hydrocarbon is selected from the group of aliphatic hydrocarbons.

4. A process as defined in claim 1 in which at least one of said reaction products is in a gas phase.

5. A process for producing acetylene comprising the steps of:
   (a) feeding at least one hydrocarbon into an electric arc reaction chamber;
   (b) striking and maintaining an arc between a cathode and an anode electrode, one of which is formed from a carbonaceous material, positioned in the reaction chamber for producing carbon vapor independently of said hydrocarbon and heating the hydrocarbon;
   (c) mixing and reacting the carbon vapor and hydrocarbon at a temperature exceeding the temperature at which carbon exists as a vapor to form reaction products; and
   (d) rapidly quenching the reaction products to a temperature below which the acetylene decomposition rate is negligible.

6. A process as defined in claim 5 in which said reaction takes place in the vicinity of one atmosphere pressure.

7. A process as defined in claim 5 in which said hydrocarbon is selected from the group of aliphatic hydrocarbons.

8. A process as defined in claim 5 in which said carbonaceous electrode is the anode.

9. A process as defined in claim 5 in which said hydrocarbon is converted to hydrogen, carbon, and carbon-hydrogen species.

10. A process for producing acetylene comprising the steps of:
    (a) striking and maintaining an arc between electrodes, one of which is formed from a carbonaceous material, for volatilizing the carbonaceous material to form an independent source of carbon vapor;
    (b) mixing and reacting at least one hydrocarbon with the carbon vapor at a temperature exceeding the temperature at which carbon exists as a vapor for producing reaction products; and
    (c) rapidly quenching the reaction products to a temperature below which the decomposition rate of acetylene is negligible.

11. A process for producing acetylene as described in claim 10 in which said hydrocarbon is selected from the group of aliphatic hydrocarbons.

12. A process for producing acetylene as described in claim 10 in which said reaction takes place in the vicinity of one atmosphere pressure.

13. A process as defined in claim 10 in which said hydrocarbon is converted to hydrogen, carbon, and carbon-hydrogen species.

14. A process for producing carbon black comprising the steps of:
    (a) providing an independent source of carbon vapor;
    (b) mixing and reacting at least one hydrocarbon with said carbon vapor at a temperature exceeding the temperature at which carbon exists as a vapor to produce gaseous reaction products; and
    (c) rapidly cooling the reaction products to a temperature below that for carbon black formation.

15. A process for producing carbon black comprising the steps of:
    (a) feeding at least one hydrocarbon into an electric arc reaction chamber;
    (b) striking and maintaining an arc between a cathode and an anode electrode one of which is formed from a carbonaceous material positioned in the reaction chamber for volatilizing the carbonaceous material for producing carbon vapor independently of said hydrocarbon and heating the hydrocarbon;

(c) mixing and reacting the carbon vapor and hydrocarbon to form gaseous reaction products; and
(d) rapidly cooling the reaction products to a temperature below that for carbon black formation.

16. A process for producing carbon black comprising the steps of:
   (a) striking and maintaining an electric arc between electrodes, one of which is formed from a carbonaceous material, to volatilize the carbonaceous material to form an independent source carbon vapor;
   (b) mixing at least one hydrocarbon with the carbon vapor at a temperature exceeding the temperature at which carbon exists as a vapor for producing reaction products; and
   (c) rapidly cooling the reaction products to a temperature below that for carbon black formation.

17. A process for producing acetylene and carbon black including means for adjusting the relative proportions of acetylene and carbon black comprising the steps of:
   (a) feeding a predetermined quantity of hydrocarbon into an electric arc reaction chamber;
   (b) striking and maintaining an arc between a cathode and an anode electrode, one of which is formed from a carbonaceous material positioned in the reaction chamber for volatilizing the carbonaceous material for producing carbon vapor independently of said hydrocarbon and heating the hydrocarbon;
   (c) adjusting the electric arc power level for controlling the carbon vaporization rate and thereby the $C/H_2$ ratio;
   (d) mixing and reacting the carbon vapor and hydrocarbon at a temperature exceeding the temperature at which carbon exists as a vapor to form reaction products the composition of which is a function of the $C/H_2$ ratio; and
   (e) rapidly quenching the reaction products to a temperature below which the acetylene decomposition rate is negligible.

18. A process for producing acetylene and carbon black including means for adjusting the relative proportions of acetylene and carbon black comprising the steps of:
   (a) striking and maintaining an arc between a cathode and an anode electrode, one of which is formed from a carbonaceous material, positioned in a chamber for volatilizing the carbonaceous material for producing an independent source carbon vapor;
   (b) mixing and reacting the carbon vapor with at least one hydrocarbon at a temperature exceeding the temperature at which carbon exists as a vapor to form reaction products the composition of which is a function of the $C/H_2$ ratio;
   (c) adjusting the electric arc power level for controlling the carbon vaporization rate and thereby the $C/H_2$ ratio; and
   (d) rapidly cooling the reaction products to a temperature below which the acetylene decomposition rate is negligible.

19. A process for producing acetylene and carbon black by the reaction of a hydrocarbon which comprises:
   (a) providing a reaction zone maintained at an elevated temperature in excess of the sublimation temperature of carbon;
   (b) introducing a quantity of carbon vapor from an independent source of carbon and of said hydrocarbon in controlled proportions into said reaction zone under mixing, decomposing, and reacting conditions;
   (c) withdrawing the reaction products of said hydrocarbon and carbon vapor from said reaction zone; and
   (d) rapidly cooling said reaction products to a reduced temperature at which acetylene is relatively stable.

References Cited

UNITED STATES PATENTS

| | | | |
|---|---|---|---|
| 2,002,003 | 5/1935 | Eisenhut et al. | 204—171 |
| 3,073,769 | 1/1963 | Doukas | 204—171 |

FOREIGN PATENTS 839,816  6/1960  Great Britain.

JOHN H. MACK, *Primary Examiner.*

HOWARD S. WILLIAMS, *Examiner.*